United States Patent
Hickson

[11] 3,892,655
[45] July 1, 1975

[54] LAYERED CLAY MINERALS, CATALYSTS, AND PROCESSES FOR USING

[75] Inventor: Donald A. Hickson, Richmond, Calif.

[73] Assignee: Chevron Research Company, San Francisco, Calif.

[22] Filed: Mar. 18, 1974

[21] Appl. No.: 452,473

Related U.S. Application Data

[62] Division of Ser. No. 311,081, Dec. 1, 1972, Pat. No. 3,844,979.

[52] U.S. Cl. ............... 208/111; 208/120; 208/143; 208/216; 252/441; 252/455 R
[51] Int. Cl. . C01b 33/28; C10g 13/02; C10g 11/18
[58] Field of Search ............ 208/111, 120; 252/441, 252/442, 455 R

[56] References Cited
UNITED STATES PATENTS

| | | | |
|---|---|---|---|
| 3,535,230 | 10/1970 | Kittrell | 208/60 |
| 3,632,502 | 1/1972 | Kittrell | 208/60 |
| 3,664,973 | 5/1972 | Jaffe | 252/455 R |
| 3,729,429 | 4/1973 | Robson | 252/454 |
| 3,795,606 | 3/1974 | Jaffe | 208/111 |
| 3,803,026 | 4/1974 | Jaffe | 208/111 |
| 3,838,040 | 9/1974 | Ward | 208/111 |
| 3,838,041 | 9/1974 | Sawyer et al. | 208/120 |

*Primary Examiner*—Delbert E. Gantz
*Assistant Examiner*—G. E. Schmitkons
*Attorney, Agent, or Firm*—G. F. Magdeburger; R. H. Davies

[57] ABSTRACT

A layer-type, trioctahedral, clay-like mineral having the empirical formula $$MgO : sSiO_2 \; aAl_2O_3 : bAB : xH_2O$$

wherein the layer-lattice structure is composed of said silica, said alumina, said magnesia, said A and said B, and wherein $s$ is from 0.66 to 1.33, preferably $1.0 \leq s \leq 1.33$,
$a$ is $0 < a \leq 0.33$, preferably $0.01 \leq a \leq 0.166$,
$b$ is $0 < b \leq 0.33$, preferably $0.01 \leq b \leq 0.166$,
A is one equivalent of an exchangeable cation having a valence of 3 or less and is external to the layers of the framework or at the edges or between successive layers of the structure,
B is chosen from the group of negative ions consisting of $F^-$, $OH^-$, $\frac{1}{2}O^{--}$ and mixtures thereof, and is internal or at the edges and surfaces of the layers of the framework structure, and
$x$ is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5335 to 1.5176 Angstroms, preferably 1.5267 to 1.5244 Angstroms, by x-ray diffraction analysis.

The mineral is useful in catalytic cracking processes and may be used as one component of a hydroconversion catalyst.

16 Claims, No Drawings

LAYERED CLAY MINERALS, CATALYSTS, AND PROCESSES FOR USING

This is a division of application Ser. No. 311,081, filed Dec. 1, 1972, now U.S. Pat. No. 3,844,979.

BACKGROUND OF THE INVENTION

1. Field of the Invention

This invention is directed to a layer-type, trioctahedral, clay-like mineral containing magnesia as a component thereof (sometimes hereinafter referred to as LTCM).

Amorphous cracking catalysts containing magnesia have long been known. They have highly desirable properties, such as high liquid yields and good $C_4$ olefin yields. However, they also have attendant problems which have severely limited their commercial use. They have only marginal thermal sintering stability, poor regenerability, and small pore size.

This invention then is directed to a layered crystalline aluminosilicate mineral containing magnesia within defined limits relative to the alumina and silica and which retains desirable features of the amorphous magnesium oxide cracking catalysts, while incorporating the magnesia in a clay-like structure.

Additionally, hydroconversion catalysts having as one component of the catalyst the layered mineral of the present invention also form a part of this invention, together with a hydroconversion process using said hydroconversion catalysts.

2. Description of the Prior Art

Considerable research has been directed in recent years to the synthesis of clay minerals.

For example, U.S. Pat. No. 3,252,757 discloses synthetic silicate minerals of the layered type having the empirical formula $$n\text{SiO}_2 : \text{Al}_2\text{O}_3 : m\text{AB} : x\text{H}_2\text{O}$$

where the layer lattices comprise said silica, said alumina, and said B, and where $n$ is from 2.4 to 3.0, $m$ is from 0.2 to 0.6, A is an exchangeable cation such as $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, this component representing total water, interlamellar plus structural, as determined by ignition loss at 1000°C., said mineral being characterized by a $d_{001}$ spacing of at least 10.4 Angstroms but not more than 14.7 Angstroms, determined at 50% relative humidity.

U.S. Pat. Nos. 3,252,757 and 3,252,889 are both concerned with layered crystalline structures of the dioctahedral type.

U.S. Pat. No. 3,252,889 discloses synthetic silicate minerals of mixed layered crystal structure with randomly alternating layers of montmorillonite-like and mica-like clay mineral, having the empirical formula $$n\text{SiO}_2 : \text{Al}_2\text{O}_3 : m\text{AB} : x\text{H}_2\text{O}$$

where the layer lattices comprise said silica ($SiO_2$), said alumina ($Al_2O_3$), and said B, and where $n$ is from 2.4 to 3.0, $m$ is from 0.2 to 0.6, A is one equivalent of an exchangeable cation selected from the group consisting of hydrogen, ammonium, alkali metal and alkaline earth metal ions and mixtures thereof, and is external to the lattice, B is one equivalent of an anion chosen from the group which consists of fluoride, hydroxyl and oxygen ions and mixtures thereof, and is internal in the lattice, and $x$ is from 2.0 to 3.5 at 50% relative humidity, this component representing total water, interlamellar plus structural, as determined by ignition loss at 1000°C., said mineral being further characterized by a $d_{001}$ spacing of at least 10.4 Angstrom units but not more than 14.7 Angstrom units, determined at 50% relative humidity.

U.S. Pat. No. 3,586,478 discloses a method for producing synthetic swelling clays of hectorite type by forming an aqueous slurry from a water-soluble magnesium salt, sodium silicate, sodium carbonate or sodium hydroxide, and material delivering lithium and fluoride ions to the slurry. This aqueous slurry is hydrothermally treated to crystallize the synthetic minerallike clay. A clay-like mineral is stated to be provided by the invention, having the structural formula:

$$(Si_8Mg_{6-x}Li_x \cdot O_{20} \cdot [OH]_{4-y}F_y)^{x(-)} \cdot (x/m)M^{(+)}$$

in which $x$ is between 0 and 6, $y$ is from 1 up to but excluding 4, M is a cation. Suitably $y$ is at least 1.5.

U.S. Pat. No. 3,666,407 teaches a process for producing synthetic hectorite clays having rheological properties similar to those of natural hectorite, which has the formula $$[Si_8Mg_{5.34}Li_{0.66}(OH)_4O_{20}]^{-}{}_{0.66}$$

wherein F may replace some of the OH substituent.

U.S. Pat. No. 3,671,190 teaches a process for preparing a synthetic clay-like mineral of the smectite type, having the general structural formula $$[Si_8Mg_aLi_bH_{4+c}O_{24}]^{(12-2a-b-c)-} \cdot M(12-2a-b-c)+$$

and having M as a sodium, a lithium or an equivalent of an organic cation.

Amorphous catalysts containing magnesia are well known. Exemplary prior art includes U.S. Pat. Nos. 2,988,521, 2,447,181 and 2,532,525.

SUMMARY OF THE INVENTION

The present invention is directed to a layer-type, trioctahedral, clay-like mineral (LTCM) having the empirical formula $$\text{MgO} : s\text{SiO}_2 : a\text{Al}_2\text{O}_3 : b\text{AB} : x\text{H}_2\text{O}$$

wherein the layer-lattice structure is composed of said silica, said alumina, said magnesia, said A and said B, and wherein $s$ is from 0.666 to 1.33, preferably $1.0 \leq s \leq 1.33*$, $a$ is from $0 < a \leq 0.333$, preferably $0.01 \leq a \leq 0.166*$, $b$ is from $0 < b \leq 0.333$, preferably $0.01 \leq b \leq 0.1166*$, A is one equivalent of an exchangeable cation having a valence of 3 or less and is external to the layers of the framework or at the edges or between successive layers of the structure, B is chosen from the group of negative ions consisting of $F^-$, $OH^-$, $\frac{1}{2}O^{--}$ and mixtures thereof, and is internal or at the edges and surfaces of the layers of the framework structure, and $x$ is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5335 to 1.5176 angstroms, preferably 1.5267 to 1.5244 angstroms by x-ray diffraction analysis.

*expressed as molar ratios

Also encompassed in the present invention is a precursor composition from which the clay-like mineral described above can be prepared, comprising:

1. water;
2. silica, alumina and magnesia; and
3. a cation such as ammonium, sodium, potassium, magnesium, barium, strontium, aluminum, or any monovalent, divalent or trivalent cation, together with an anion such as hydroxyl, fluoride, acetate or chloride.

Also included with the present invention are hydroconversion catalysts encompassing the clay-like mineral having the empirical formula set forth above which has been combined with one or more catalytically active metals or compounds thereof. Particularly useful metal components are metals or oxides, sulfides, chlorides, or the like, of Group VI-B and Group VIII metals, particularly platinum, palladium, cobalt, nickel, molybdenum, and tungsten.

A hydroconversion process using the hydroconversion catalyst described above also forms part of this invention.

Additionally, a catalytic cracking catalyst comprising the dehydrated form of LTCM, either alone or in combination with other cracking catalyst components such as zeolitic components and/or amorphous silica-alumina, etc., forms a part of this invention.

A catalytic cracking process using the catalytic cracking catalyst described above is also encompassed within this invention.

DETAILED DESCRIPTION OF THE INVENTION, INCLUDING PREFERRED EMBODIMENTS

The present invention is directed to a layer-type, trioctahedral, clay-like mineral (LTCM) having the empirical formula $$MgO : sSiO_2 : aAl_2O_3 : bAB : xH_2O$$

wherein the nomenclature and proportions are as defined above under Summary of the Invention.

Also encompassed in the present invention are precursor compositions (all parts by weight) from which the clay-like mineral described above can be prepared, comprising:

1. from about 70 to about 95% water, based on (1) and (2);
2. from about 30 to about 5% (combined weight percent) of silica, alumina and magnesia, based on (1) and (2), such that the respective molar ratios of the silica and alumina with regard to the magnesia are $0.666 \leq s \leq 1.33$ (That is, there are 0.666 to 1.33 moles of silica per mole of magnesia, and 0 to 0.33 moles of alumina per mole of magnesia.)

$0 < a \leq 0.33$; and 3. a cation such as ammonium, sodium, potassium, magnesium, barium, strontium, aluminum, or any monovalent, divalent or trivalent cation, together with an anion such as hydroxyl, fluoride, acetate or chloride, in sufficient quantity that the pH of the mixture is in the range of from 7.0 to about 10.5.

Also forming part of the present invention are hydroconversion catalysts containing LTCM and at least one additional catalytically active metal, either in the metallic state or in the oxide, sulfide, chloride, etc., state.

LTCM is also useful as such as a catalytic cracking catalyst, or may be combined with other components such as a siliceous gel, zeolites, and the like, to form a composite catalyst for catalytic cracking.

METHOD OF PREPARATION

LTCM is preferably prepared by hydrothermal crystallization from aqueous slurries of a mixture of hydrous silica, hydrous alumina, hydrous magnesia and fluoride of appropriate composition. After formation of the aqueous slurry, it is preferably blended until homogeneous and then aged. The pH is adjusted to the desired range of from about 7.0 to about 10.5, preferably 9.0 to 10.5, and the slurry is then heated to a temperature of from 550° to 700°F., preferably 590° to 650°F., preferably under autogenous pressure and preferably with stirring, for a period of time of from about ½ hour to about 4 hours, preferably from about ¾ hour to about 2 hours. Increased hydrothermal treatment times result in products having reduced surface area and, consequently, reduced catalytic activity.

After the hydrothermal crystallization is completed, the resulting slurry is allowed to cool and is then dried, preferably under vacuum. After drying is completed, the product is then ground to the desired size.

HYDROCONVERSION CATALYSTS

When the layered mineral (LTCM) of the present invention is used as one component of a hydroconversion catalyst, the catalysts containing the LTCM can be of widely varying composition. At least one catalytically active metal or stable inorganic compound thereof is combined with LTCM. LTCM becomes dehydrated during drying and calcination of the catalyst composite. Alternatively, LTCM can be dehydrated prior to compositing with the other component(s) of the hydroconversion catalyst. LTCM and the catalytically active metal or stable inorganic compound thereof may form part of a matrix comprised of a siliceous gel, may be combined with zeolitic components, and the like. Preferably when the catalyst includes a matrix comprising a siliceous gel such as a silica-alumina gel, it will be further characterized by an average pore diameter below 100 Angstroms and a surface area above 200 m²/gram. By "hydroconversion" is meant hydrocracking, hydrofining, hydrogenation and dehydrogenation processes.

When the catalyst includes a matrix comprising a silicaalumina gel, the catalyst may advantageously comprise titanium, zirconium, thorium, or hafnium, or any combination thereof, in the form of metals, oxides, sulfides, or any combination thereof, in an amount of 1 to 10 weight percent, preferably 5 to 9 weight percent, of said matrix, calculated as metal. Titanium, preferably in the form of titania, is preferred.

The catalytically active metal component may be selected from Group VI-B or Group VIII, or may be comprised of mixtures from both Group VI-B and Group VIII, as well as being combined with promoters from Group IV. The Group VIII component may be, for example, nickel, cobalt, platinum or palladium, in the form of the metal, oxide, sulfide, or any combination thereof. When the catalyst does not include a matrix comprising a silica-alumina gel, the Group VIII component may be present in the catalyst in an amount of from 0.4 to 15 weight percent, calculated as metal, and based on the LTCM component.

The Group VI-B component, when present either by itself or in combination with a Group VIII component, may comprise tungsten, molybdenum, and/or chromium.

When the catalyst includes a matrix comprising a silicaalumina gel, a Group VI-B component may be present in the catalyst in an amount of from 0.01 to 15 weight percent, preferably 0.01 to 10 weight percent, calculated as metal and based on the matrix. When the catalyst comprises a mixture of Group VI-B and Group VIII components such as nickel or cobalt with molybdenum or tungsten, the combined weight of the Group VI-B and Group VIII components, calculated as metal and based on the matrix, will generally be in the range of from 5 to 20 weight percent. When platinum or palladium or compounds thereof are used in the hydroconversion catalyst discussed herein, the amounts thereof will generally be less than when nickel or cobalt or compounds thereof are used.

The hydroconversion catalyst discussed herein may advantageously contain a Group IV-A component, i.e., tin, germanium, or lead, or compounds thereof, as promoters, particularly when the catalyst also contains nickel or a compound thereof, regardless of whether the catalyst includes a matrix comprising a silica-alumina gel. The Group IV-A component may be present in an amount of 0.5 to 30 weight percent, preferably 2 to 15 weight percent, based on the catalyst and calculated as metal, when the catalyst includes a matrix comprising a silica-alumina gel. When the catalyst does not include a matrix comprising a silica-alumina gel, a Group IV-A metal or compound thereof may be present in an amount of 0.2 to 15 weight percent, based on the catalyst and calculated as metal. When the hydroconversion catalyst includes a matrix comprising a silica-alumina gel, the LTCM will generally be present in an amount of from 1 to 60 weight percent of the catalyst.

The hydroconversion catalysts of the present invention can be prepared by conventional techniques well known in the art. For example, the hydrogenating component can be added by wellknown impregnation techniques, by precipitation onto the LTCM, by ion exchange, and the like. See U.S. Pat. No. 3,535,228.

The LTCM component becomes dehydrated during drying and calcining of the catalyst, and it is this dehydrated form of the LTCM which constitutes a part of the hydroconversion catalyst.

Calcination of the hydroconversion catalysts will be carried out at a temperature in the range of from about 800° to 1400°F., preferably 900° to 1100°F.

The hydroconversion process of the present invention using the hydroconversion catalysts disclosed herein will be carried out using conventional hydroconversion conditions. These include for hydrocracking, hydrofining and hydrogenation a temperature in the range 400° to 950°F., preferably 500° to 850°F., a pressure in the range 800 to 3500 psig, preferably 1000 to 3000 psig, a liquid hourly space velocity in the range 0.1 to 5.0, preferably 0.5 to 5.0, and more preferably 0.5 to 3.0. The total hydrogen supply rate (makeup and recycle hydrogen) will be 200 to 20,000 SCF, preferably 2000 to 20,000 SCF, of hydrogen per barrel of feedstock. For dehydrogenation, temperatures of from 900° to 950°F. are preferably used, together with low pressures in the range of 100 to 200 psig.

HYDROCONVERSION FEEDSTOCKS

When the layered clay-like mineral is used as one of the components of a hydroconversion composite catalyst, the feedstocks supplied to the hydroconversion zone may be selected from a broad class of feedstocks. These include petroleum distillates, solvent-deasphalted petroleum residua, shale oils and coal tar distillates. The feedstocks contain substantial amounts of materials boiling above 200°F., preferably substantial amounts of materials boiling in the range 350° to 950°F., and more preferably in the range 400° to 900°F. Suitable feedstocks include those heavy distillates normally defined as heavy straight-run gas oils and heavy cracked cycle oils, as well as conventional FCC feed and portions thereof. Cracked stocks may be obtained from thermal catalytic cracking of various stocks, including those obtained from petroleum gilsonite and shale and coal tar.

While the process of the present invention can be practiced when supplying to the hydroconversion zone hydrocarbon feeds containing relatively large quantities of organic nitrogen and sulfur, it is preferred that the organic nitrogen content be less than 1000 ppm. The preferred range is 0.5 to 1000 ppm., more preferably 0.5 to 100 ppm. The sulfur content of the feedstock should also preferably be maintained at a relatively low level of from 0 to 3 weight percent, preferably 0 to 1 weight percent.

CATALYTIC CRACKING CATALYSTS

When the layered clay-like minerals having the empirical formula set forth above are utilized as catalytic cracking catalysts either alone or in combination with zeolites and/or amorphous inorganic oxide components such as silica, alumina, silicaalumina, and silica-alumina-magnesia, said layered clay-like minerals are dehydrated to remove water, and it is the dehydrated materials which constitute the cracking catalysts of the present invention.

Dehydration of the LTCM of the present invention can be most easily accomplished by calcination. Such calcination is carried out at a temperature in the range of from 800° to 1400°F. Preferably a temperature in the range of from 900° to 1100°F. is used. The calcination may be effected under vacuum or with the use of an inert purge gas such as nitrogen or with the use of a purge gas such as air. Alternatively, the hydrated LTCM of the present invention can be employed directly in high-temperature cracking processes without prior dehydration, with the dehydration occurring in situ. However, it is preferred that the dehydration be carried out prior to the initiation of the cracking process.

The composite catalytic cracking catalysts of this invention which utilize LTCM may be provided by a variety of procedures and utilize a variety of components. U.S. Pat. No. 3,140,253, at Cols. 9 and 10, describes the combination of zeolites with a variety of porous matrix materials, including clays. In a similar manner, LTCM may be combined, dispersed or otherwise intimately admixed with zeolites and/or porous matrix materials such as clays, amorphous inorganic oxide components, and the like.

A particularly preferred mineral composition of this invention for use as a catalytic cracking catalyst or as one component thereof is the mineral composition of the formula $$MgO : sSiO_2 : aAl_2O_3 : bAB : xH_2O$$

wherein the nomenclature and proportions are as generally defined above under Summary of the Invention, but with A limited to cations which upon calcination give a product in the hydrogen form and wherein B is at least, in part, fluoride (present in sufficient amount to give a weight percent fluoride after calcination of 1 to 3%, preferably 2%).

Catalytic cracking processes of the present invention are carried out under conditions which are known in the art. Generally, the temperature will be in the range of from 600° to 1100°F., preferably in the range of from 800° to 975°F., more preferably from about 900° to 950°F. The pressure will be in the range of from about 1 to 200 psig, preferably 10 to 30 psig, and the liquid hourly space velocity ranging from 0.5 to 100 or even higher, at a conversion rate of from 30 to 85%, preferably 40 to 85%.

Hydrocarbon feedstocks fed to the catalytic cracking zone will in general have boiling ranges above about 400°F., for example gas oils, cycle stocks, naphthas and the usual charge stocks, particularly those used for producing gasoline.

EXAMPLES

The present invention will be better understood with reference to the following examples, which are offered by way of illustration and not by way of limitation.

EXAMPLE 1

A slurry consisting of 22.4 grams of aluminum trihydrate powder and 99.9 grams of magnesium hydroxide powder (31.7 wt.% volatiles) was dispersed in an aqueous solution consisting of 18.1 ml. of concentrated ammonium hydroxide (30 wt.% NH$_4$) dissolved in 1492 ml. of distilled water. The slurry was homogenized in a high-speed mixer. 393.7 grams of an aqueous silica sol (30.1 wt.% SiO$_2$) was blended into the slurry with stirring. The pH was adjusted to 9.9 with concentrated ammonium hydroxide and stirring continued for 30 minutes. The total slurry composition consisted of 10 weight percent of solids having the composition expressed as mol ratios of oxides to magnesia corresponding to 0.08 (NH$_4$)$_2$O : MgO : 0.08 Al$_2$O$_3$ : 1.166 SiO$_2$ : $x$H$_2$O. The slurry was transferred to a one-gallon stainless steel autoclave fitted with a paddle stirrer and cooling coil. After sealing the vessel, the material was heated approximately 4°F./minute from 200°F. to 640°F. while stirring at 200 RPM. The slurry was held 4 hours at 640°F. and 2050 psig before rapidly cooling to ambient temperature. The final pH of the slurry was 9.3. The slurry was evaporated to dryness at 150°F. on stainless steel trays in a circulating oven and was then dried overnight (about 16 hours) at 194°F. at 20 inches vacuum (mercury) with a slow nitrogen purge. Product yield was 209 grams (expected yield 201 grams on an anhydrous basis). The dry cake was crushed and ground to pass 100 mesh and redried at 194°F. overnight at 20 inches vacuum (mercury). Loss on ignition at 950°F. was 3.81 weight percent. Skeletal density of the product was 2.625 grams/cc. The composition of the ignited product was determined by electron microprobe analysis and compared with expected values:

|  | Calculated (wt.%) | Found (Wt.%) |
|---|---|---|
| MgO | 33.9 | 32.8 |
| Al$_2$O$_3$ | 7.1 | 5.7 |
| SiO$_2$ | 58.9 | 55.0 |

X-ray diffraction analysis of the dried powder indicated a clay structure of the saponite type. The basal reflection of air-dried oriented films and glycol-treated oriented films was $d_{001} = 11.5–14.0$ A. for the former and $d_{001} = 18$ A. for the latter, indicating an expandable layer-lattice structure. The $d_{06}$ hk reflection in the diffraction pattern occurred at 60.7 °2$\theta$, corresponding to $d = 1.52$ A. for a saponite clay. The nitrogen BET surface area of the powder after air calcination for 4 hours at 400°F. in air followed by 5 hours at 950°F. in air was 202 m$^2$/g. and the dodecane pore volume was 0.264 cc/g.

EXAMPLE 2

A slurry of 44.33 grams of aluminum trihydrate and 99.05 grams of magnesium hydroxide dispersed in an aqueous solution consisting of 8.24 grams ammonium fluoride and 37.0 cc. of concentrated ammonium hydroxide dissolved in 1707 cc. of distilled water was prepared, using a colloid mill to homogenize the mixture. To the slurry was added 334.8 grams of an aqueous silica sol (30.1 wt.% SiO$_2$) with continued stirring. The pH was adjusted to 9.9 with concentrated ammonium hydroxide. The slurry consisted of 10 weight percent solids of composition (expressed as mole ratios of oxides to MgO) corresponding to 0.166 (NH$_4$)$_2$O : 0.126 NH$_4$F : MgO : 0.166 Al$_2$O$_3$ : SiO$_2$ : 0.207 H$_2$O. The slurry was autoclaved for 1 hour at 640°F. and 2050 psig while stirring at 200 RPM. The pH of the final slurry was 9.9.

The product workup was identical to that described in Example 1. Product yield was 165 grams. The loss on ignition at 950°F. was 7.38 wt.%. The composition of the product was determined by electron microprobe analysis and compared with the calculated composition:

|  | Calculated (Wt.%) | Found (Wt.%) |
|---|---|---|
| MgO | 33.7 | 33.4 |
| Al$_2$O$_3$ | 14.2 | 14.6 |
| SiO$_2$ | 50.2 | 50.8 |
| F | 2.0 | 2.0 |

The BET nitrogen surface area after calcination for 5 hours at 950°F. was 146 m$^2$/g. and the dodecane pore volume was 0.32 cc./g. X-ray diffraction analysis indicated a clay structure of a saponite type.

EXAMPLE 3

The product obtained from Example 2 was passed through a pulverizer (micronizer) to further reduce the crystalline size to micron dimensions. The powder was impregnated with water using an immiscible solvent displacement technique described by Tauser, *J. Catalysis* 18, 358 (1970). 108 grams of dried saponite clay powder was dispersed in 500 cc. of n-heptane using a homogenizer. A volume of water corresponding to 0.7 cc. $H_2O$/gram clay was slowly titrated into the heptane-clay dispersion. A light but pasty mass resulted. Heptane was removed by filtration and the residual mass resulted. Heptane was removed by filtration and the residual mass extruded through a 1/16 inch die in two passes at 2000 and 5000 tons pressure, respectively. The extruded mass was dried overnight at 194°F. at 20 inches vacuum (mercury) with a slow nitrogen purge to remove excess heptane, then calcined 4 hours at 400°F. in air and 5 hours at 950°F. in air to obtain a strong catalyst extrudate. The surface area of the extrudate was found to be 146 m²/g. and the dodecane pore volume 0.318 cc./g. The sample was divided and half was given a steam treatment consisting of 6 hours at 1400°F. in 100% steam atmosphere.

EXAMPLE 4

The steam-treated catalyst of Example 3 was tested for catalytic cracking ability using the procedure outlined below. A 625°–900°F. gas oil cut prepared by distillation from a Pascagoula gas oil of wider boiling range and having a feed gravity of 24.1°API was contacted with the catalyst of Example 3. The reaction was carried out at a temperature of 925°F., at substantially atmospheric pressure, and at a weight hourly space velocity of 3.72. The catalyst had a particle size range from 28 to 60 mesh. The catalyst/oil ratio was 3.23:1.

The product had the distribution set forth in Table I below. A total conversion to materials boiling below 430°F. of 34.15% was obtained.

TABLE I

Product Yields, Wt.%

| | | |
|---|---|---|
| Coke | | 2.04 |
| $H_2$ | 0.38 | |
| $C_1$ | 0.21 | |
| *$C_2 + C_2^{--}$ | 0.95 | |
| **$C_2^-$ Gas | | 1.54 |
| $C_3$ | 0.45 | |
| *$C_3^{--}$ | 1.23 | 1.68 |
| Total $C_3$'s | | 1.68 |
| $iC_4$ | 0.28 | |
| $nC_4$ | 0.20 | |
| *$C_4^{--}$ | 1.87 | |
| Total $C_4$'s | | 2.35 |
| $C_5$–430°F. gasoline | | 26.54 |
| 430–625°F. LCO | | 19.37 |

*The symbols $C_2^{--}$, $C_3^{--}$ and $C_4^{--}$ mean unsaturated hydrocarbons having two, three and four carbon atoms respectively, e.g., ethylene, propylene & 1-butene.

As can be seen from Table I, the $C_3$, $C_2^-$ and coke represented only about 15% of the converted material.

EXAMPLE 5

A sample of synthetic clay, prepared according to the procedure of the present invention and having a clay structure of the saponite type and the composition shown in the table of Example 2 is impregnated with an aqueous solution of palladium tetraamine dinitrate to give the metals loading of 0.5 wt.% Pd, using the immiscible solvent displacement technique described by Tauser, supra. The impregnated clay is extruded, dried and calcined (4 hours at 400°F. in air and 5 hours at 950°F. in air.

EXAMPLE 6

The catalyst of Example 5 is evaluated for hydrocracking using a denitrified Mid-Continent gas oil which has the following inspections:

| | |
|---|---|
| °API | 33.3 |
| Aniline point, °F. | 177.6 |
| Nitrogen, ppm | 0.2 |
| PNA, mass spec. | 16.5 |
| | 68.7 |
| | 14.8 |
| D-1160 Distillation, °F. | |
| 10/50/90%, Atmos. press. | 515/666/762 |

Test conditions are: extinction recycle below 400°F. recycle cut point, 60% per-pass conversion, 1300 psig total pressure, and 5600 SCF/bbl. recycle gas rate.

The catalyst gives a low yield of undesirable $C_4^-$ products and a good yield of $C_5+$ products. The octane number of the light gasoline component is better than that obtained with some prior art hydrocracking catalysts.

It is apparent that many widely different embodiments of this invention may be made without departing from the scope and spirit thereof; and, therefore, it is not intended to be limited except as indicated in the appended claims.

What is claimed is:

1. A hydroconversion process comprising contacting a hydrocarbon feedstock at conventional hydroconversion conditions with a catalyst comprising: (1) a layer-type trioctrahedral, clay-like mineral, and (2) at least one hydrogenation component, said mineral having prior to dehydrating and calcining of said catalyst, the empirical formula:

$$MgO : sSiO_2 : aAl_2O_3 : bAB : xH_2O$$

wherein the layer-lattice structure is composed of said silica, said alumina, said magnesia, said A and said B, and wherein
  $s$ is from 0.66 to 1.33,
  $a$ is $0 < a \leq 0.333$,
  $b$ is $0 < b \leq 0.333$,
  A is one equivalent of an exchangeable cation having a valence of 3 or less and is external to the layers of the framework or at the edges or between successive layers of the structure,
  B is chosen from the group of negative ions consisting of $F^-$, $OH^-$, $½O^{--}$ and mixtures thereof, and is internal or at the edges and surfaces of the layers of the framework structure, and
  $x$ is from 2 to 3.5 at 50% relative humidity,
said mineral being characterized by a $d_{001}$ spaacing at said humidity within the range which extends from a lower limit of about 10 Angstroms to an upper limit of 18 Angstroms when A is divalent or trivalent, with intermediate values possible when A is a mixture of monovalent, divalent and trivalent cations, and a $d_{06}$ spacing at said humidity in the range of from 1.5375 to 1.5176 Angstroms by x-ray diffraction analysis.

2. The process of claim 1 wherein $1.0 \leq s \leq 1.33$, $0 < a \leq 0.166$, and $0 < b \leq 0.166$, A is $NH_4^+$ and B is a mixture of $F^-$ and $OH^-$.

3. The process of claim 1 wherein A is a cation that may be readily converted into the hydrogen form upon calcination.

4. The process of claim 1 wherein said hydroconversion process is hydrocracking.

5. The process of claim 1 wherein said feedstock contains a substantial amount of material boiling above 200°F and is selected from the group consisting of petroleum distillates, solvent-deasphalted petroleum residua, shale oils and coal tar distillates.

6. The process of claim 1 wherein said calcining gives a catalyst with said layered mineral in the hydrogen form and wherein $s=1.166$, $a=0.08$ and said layered mineral after said calcining has a fluoride content of from 1 to 3 weight percent.

7. The process of claim 1 wherein said hydrogenation component comprises a Group VIB or Group VIII metal, oxide, sulfide or any combination thereof.

8. The process of claim 1 wherein said hydrogenation component comprises a noble metal.

9. The process of claim 1 wherein said hydrogenation component comprises platinum.

10. A catalytic conversion process comprising contacting a hydrocarbon feedstock at conventional catalytic conversion conditions with a catalyst comprising a layer-type trioctahedral, clay-like mineral, said mineral having prior to dehydrating and calcining of said catalyst the empirical formula:

$$MgO : sSiO_2 : aAl_2O_3 : bAB : xH_2O$$

wherein the layer-lattice structure is composed of said silica, said alumina, said magnesia, said A and said B, and wherein $s$ is from 0.66 to 1.33, $a$ is $0 < a \leq 0.333$, $b$ is $0 < b \leq 0.333$, A is one equivalent of an exchangeable cation having a valence of 3 or less and is external to the layers of the framework or at the edges or between successive layers of the structure, B is chosen from the group of negative ions consisting of $F^-$, $OH^-$, $\frac{1}{2}O^{--}$ and mixtures thereof, and is internal or at the edges and surfaces of the layers of the framework structure, and $x$ is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5375 to 1.5176 Angstroms by x-ray diffraction analysis.

11. The process of claim 10 wherein $1.0 \leq s \leq 1.33$, $0 < a \leq 0.166$, and $0 < b \leq 0.166$, A is $NH_4^+$ and B is a mixture of $F^-$ and $OH^-$.

12. The process of claim 10 wherein A is a cation that may be readily converted into the hydrogen form upon calcination.

13. The process of claim 10 wherein said feedstock has a boiling range above about 400°F.

14. The process of claim 10 wherein said calcining gives a catalyst with said layered mineral in the hydrogen form and wherein $s=1.166$, $a=0.08$ and said layered mineral after said calcining has a fluoride content of from 1 to 3 weight percent.

15. The process of claim 10 wherein said catalyst further comprises an amorphous inorganic oxide.

16. The process of claim 10 wherein said catalyst further comprises a zeolite.

* * * * *